(12) United States Patent
Nemoto (10) Patent No.: US 9,038,977 B2
(45) Date of Patent: May 26, 2015

(54) HOLDING DEVICE

(75) Inventor: Takehiko Nemoto, Yokohama (JP)

(73) Assignee: NIFCO INC., Yokohama-shi, Kanagawa (JP)

( * ) Notice: Subject to any disclaimer, the term of this patent is extended or adjusted under 35 U.S.C. 154(b) by 479 days.

(21) Appl. No.: 13/580,801

(22) PCT Filed: Feb. 14, 2011

(86) PCT No.: PCT/JP2011/052978
§ 371 (c)(1),
(2), (4) Date: Sep. 13, 2012

(87) PCT Pub. No.: WO2011/105236
PCT Pub. Date: Sep. 1, 2011

(65) Prior Publication Data
US 2013/0002110 A1    Jan. 3, 2013

(30) Foreign Application Priority Data
Feb. 26, 2010   (JP) .................. 2010-041230

(51) Int. Cl.
*A47G 1/10*    (2006.01)
*B60R 11/02*   (2006.01)
(Continued)

(52) U.S. Cl.
CPC ......... *B60R 11/0241* (2013.01); *B60R 11/0211* (2013.01); *B60R 2011/0075* (2013.01);
(Continued)

(58) Field of Classification Search
CPC .............. B60R 2011/005; B60R 2011/008; B60R 2011/082; B60R 2011/0082; B60R 2011/0085; B60R 1/04; B60R 1/005; B60R 11/0241; B60R 11/0211; B60R 2011/0071; B60R 2011/0075; B60R 2011/0078

USPC ............... 248/309.1, 310, 313, 316.6, 316.1, 248/27.1, 27.3, 316.4, 316.8; 296/37.8, 296/37.12
See application file for complete search history.

(56) References Cited

U.S. PATENT DOCUMENTS 6,719,358 B2 *   4/2004   Schmidt et al. ............... 296/152
7,469,951 B2 *   12/2008  Welschholz et al. ......... 296/37.8
(Continued)

FOREIGN PATENT DOCUMENTS

EP    0775609       5/1997
FR    2921316 A1 *  3/2009    .............. B60R 11/02
(Continued)

OTHER PUBLICATIONS

China Patent Office, "Office Action for CN 201180010282.8, "Apr. 4, 2014.
(Continued)

*Primary Examiner* — Gwendolyn W Baxter
(74) *Attorney, Agent, or Firm* — Manabu Kanesaka (57) ABSTRACT

A holding device includes a case. A base includes a placement portion for placing an article, and a fixture holding portion provided on one end side of the placement portion, and is rotatably attached relative to the case through a pivot support portion. A slider is slidably attached to the base, and includes a movable holding portion for releasably holding the article between the movable holding portion and the fixture holding portion. An urging member urges the slider. A positional control device is provided between the base and the slider, and releasably locks the slider in an arbitrary position when the slider slides against an urging force of the urging member. A placement-angle holding device is provided between the base and the case, and holds the base at a predetermined placement angle relative to the case in conjunction with sliding of the slider against the urging force of the urging member.

6 Claims, 9 Drawing Sheets

(51) Int. Cl.
  *H04M 1/04* (2006.01)
  *B60R 11/00* (2006.01)
(52) U.S. Cl.
  CPC .......... *B60R2011/0078* (2013.01); *H04M 1/04* (2013.01); *B60R 2011/0071* (2013.01); *B60R 2011/008* (2013.01); *B60R 2011/0085* (2013.01)

(56) References Cited

U.S. PATENT DOCUMENTS

| | | | |
|---|---|---|---|
| 8,172,299 B2 * | 5/2012 | Lota | 296/37.8 |
| 2009/0097192 A1 * | 4/2009 | Riddiford | 361/679.01 |
| 2014/0354002 A1 * | 12/2014 | Bisceglia et al. | 296/37.12 |

FOREIGN PATENT DOCUMENTS

| | | | |
|---|---|---|---|
| JP | 03-181605 | | 8/1991 |
| JP | 06-181822 | | 7/1994 |
| JP | H09-27843 | A | 1/1997 |
| JP | 3051744 | U | 9/1998 |
| JP | 2001-061571 | | 3/2001 |
| JP | 2002-127829 | A | 5/2002 |
| JP | 2002-186530 | | 7/2002 |
| JP | 2003-273990 | A | 9/2003 |
| WO | WO 2009138353 A1 * | | 11/2009 .............. B60R 11/02 |

OTHER PUBLICATIONS

Japanese Patent Office, "Office Action for JP2009-060907", Dec. 5, 2012.

* cited by examiner

HOLDING DEVICE

FIELD OF TECHNOLOGY

The present invention relates to a holding device suitable for temporarily holding a mobile device such as, especially, a mobile phone, a game machine, a music player, and the like, or an article similar to the above, inside a vehicle chamber and the like.

BACKGROUND ART

As shown in, for example, Patent Document 1, as for the holding device holding the article, most holding devices at least comprises a base (a base portion) in which the article is placed; a slider (a sliding member or a holding member) slidably disposed in the base; and an urging member urging the slider, and by varying a holding width through sliding of the slider, the holding device can hold even the article with a different width size. Namely, in a holding structure of the Patent Document 1, there are provided holding portions facing each other in right-and-left sliders slidably placed on both sides of the base. Then, the article is held by the holding portions by sliding the sliders against an urging force of the urging member so as to be capable of holding the relevant article.

Also, in the holding structure shown in Patent Document 2, there are provided holding portions facing each other in the right-and-left sliders slidably placed on both sides of the base. Then, in the holding structure, there includes a locking device including a gear, an operating button engaging with and disengaging from the gear, and an urging member urging a button in a direction of engaging with the gear. After a position of the right-and-left sliders is adjusted by sliding the right-and-left sliders, the sliders can be locked in the position thereof. Also, in the holding structure, at a non-used time, due to the urging force of the urging member, an interval between the right-and-left sliders expands the most, and a condition thereof is maintained by the locking device. In a case where the article is held by the holding structure, the article is placed between the holding portions provided in the right-and-left sliders, and the sliders are operated to slide in a direction of approaching to each other against the urging force so as to be capable of holding the article. Then, at that time, each slider is maintained at the position after a sliding adjustment by the locking device. Also, in a case where the holding of the article is released, when the aforementioned button is pushed against the urging force, an engagement relative to the gear is released, and each slider is slid up to a position wherein the interval thereof becomes the largest by the urging force.

However, the above-mentioned holding device and the holding structure get in the way at the non-used time since the holding device and the holding structure are attached relative to a vehicle chamber wall and the like by an adhesive tape and the like. As a measure thereof, in Patent document 3, there is disclosed a housing device comprising a drawer-type slider member; a holder member holding the article by being embedded in the slider member; and a support member controlling a posture of the holder member. Also, the housing device has a structure of standing up when the holder member pulls out the slider member through the support member, and a structure of turning down in a process of being pushed in.

PRIOR ART DOCUMENTS

Patent Documents

Patent Document 1: Japanese Patent No. 4108987
Patent Document 2: German Patent Publication No. 19542720
Patent Document 3: Japanese Unexamined Patent Publication No. 2009-214724

SUMMARY OF THE INVENTION

Problems to be Solved by the Invention

In the holding device of the Patent Document 1, since a holding force holding the article is proportional to the urging force, for example, in a case where the urging force by the urging member is weak, the force holding the article also runs short, and vice versa; if the urging force is increased, operability at a time of holding the article is damaged.

In the holding structure of the Patent Document 2, in a state wherein the article is placed in the base, the article is held by operating the sliders to slide, and a state thereof can be maintained by the locking device. Also, due to a push operation of the operating button, a holding state of the article can be instantly released. However, in the holding structure, as for the locking device, unless the operating button is pushed against the urging force, the gear and an engaging portion provided on an operating button side are always engaged with each other. Therefore, in a process of operating to slide the sliders in a direction of narrowing the mutual interval, due to the gear rotating while making a contact with the engaging portion on the operating button side, "clicking" sounds are produced so as to damage a feeling of a high grade.

An object of the present invention is to provide a holding device which is further simplified without requiring a large depth size even in a case where a housing structure is employed. Also, another object of the present invention is to be capable of finely adjusting an object article to an easily viewable angle by adding a simple structure.

Means for Solving the Problems

In order to achieve the aforementioned object, the present invention provides a holding device including the following characteristics.

(1) A holding device comprises a case; a base including a placement portion for placing an article, and a fixture holding portion provided on one end side of the aforementioned placement portion, and rotatably attached relative to the aforementioned case through a pivot support portion; a slider slidably attached to the aforementioned base, and including a movable holding portion for releasably holding the article between the movable holding portion and the aforementioned fixture holding portion; and an urging member urging the aforementioned slider. The base is supported to be inversely switchable between a storage state closing an opening of the case with a face opposite to the face having the fixture holding portion protruding on a opposite side of a face, and a used state exposing the face having the fixture holding portion protruding from the opening of the case, through the pivot support portion. Also, the holding device includes a positional control device provided between the base and the slider, and releasably locking the slider in an arbitrary position when the slider is slid against an urging force of the urging member; and a placement-angle holding device provided between the base and the case, and holding the base at a predetermined placement angle relative to the case by interlocking with sliding of the slider against the urging force of the urging member.

(2) In the holding device described in (1), the aforementioned placement-angle holding device B includes a first lock member actuated to connect to the slider, and protruding outward from an end portion of the base in conjunction with the sliding of the slider against the urging force of the urging device from an initial position; and a second lock member provided in the case, facing the first lock member in the aforementioned used state, and elastically holding the base at the predetermined placement angle relative to the case by engaging with the first lock member in a state in which the first lock member protrudes outward from the end portion of the base.

(3) In the holding device described in (2), the aforementioned first lock member includes a protrusion provided on a base end side, and a claw provided on an end side, and the protrusion of the first lock member is fitted into a long groove provided in the slider. The second lock member includes a teeth portion placed along in a depth direction of the case, and the claw of the first lock member can be intermittently engaged with the teeth portion.

(4) In the holding device described in either of (1) to (3), the aforementioned positional control device includes a rack portion provided in the slider; a one-way clutch including a first gear engaging with the rack portion, and a second gear coming to a clutch disengagement idling the first gear when rotating the first gear in one direction, and coming to a clutch engagement integrally rotating with the first gear when rotating the first gear in the other direction; and the operating button slidably placed in the base, and allowing an engagement to be released by a push operation against the urging force from a normal state which has been urged in an engaging direction with (teeth of) the second gear.

(5) In the holding device described in (4), the aforementioned one-way clutch is switched between the clutch disengagement when the slider is slid against the urging force of the urging member, and the clutch engagement when the slider is slid by the urging force of the urging member. Also, in the holding device, the operating button can slide the slider up to the initial position by the urging force of the urging member by releasing the engagement with the second gear in a state of the clutch engagement.

(6) The base has a structure of being pivotally supported to be capable of turning approximately 180 degrees along an arc face of the case as a supporting point of the pivot support portion, and also of including an inversion spring stabilizing the base relative to the case in both positions of the storage state and the used state.

Effect of the Invention

In the holding device described in (1), due to an inversion switchover structure which switches the base between the storage state and the used state relative to the case as the supporting point of the pivot support portion, while maintaining usability compared to a drawer structure as shown in the Patent Document 3, the holding device can easily control a depth size of the case, and excels in a case of being restricted by a depth space of the placement portion. Also, in an article holding operation, in the used state of the base, after the article is placed in the placement portion of the base, when the slider is operated to slide in a direction of reducing a holding width against the urging force, the slider is locked in a position after the sliding (an article holding position) by the positional control device, and the article can be held between the fixture holding portion and the movable holding portion. Also, the slider is slid to the initial position by the urging force so as to be capable of maintaining the usability excellently. Additionally, as for an article holding posture, an angle in which the base holds the article by the placement-angle holding device, i.e., the holding posture can be adjusted to a simple and the best posture. The placement-angle holding device becomes effective when the slider is slid against the urging force from the initial position so as to be less prone to be a factor for generating a malfunction or wobbling, and to be capable of improving quality.

In the holding device described in (2), the placement-angle holding device comprises the first lock member placed on a base side, and the second lock member placed on a case side, engaging with the first lock member, and elastically holding a state after an angle adjustment of the base, so that a concise angle change operation can be actualized, and excellent operability can be maintained. In that case, furthermore, in the holding device described in (3), the first lock member is actuated to be connected to the slider when the protrusion and the long groove are fitted together, and also the second lock member includes the teeth portion placed in the depth direction of the case, and intermittently engages the claw of the first lock member with the teeth portion thereof so as to be capable of reliably providing an angle adjusting actuation with a simplified structure.

In the holding device described in (4), as the positional control device, i.e., a structure locking the slider in the arbitrary position when the slider has slid against the urging force, or unlocking the locking by the push operation, a highly reliable locking actuation can be actualized by the rack portion on a slider side; the one-way clutch including the first gear, and the second gear coming to the clutch disengagement at the time of rotating the first gear in one direction, and coming to the clutch engagement at the time of rotating the first gear in the other direction so as to integrally rotate; and the operating button which has been urged in the direction of engaging with the second gear in the usual aspect. In that case, furthermore, in the holding device described in (5), especially, as for the one-way clutch, when the slider is slid against the urging force, the one-way clutch is switched to the clutch disengagement, and when the slider is slid by the urging force, the one-way clutch is switched to the clutch engagement, and also the operating button releases the engagement with the second gear in the state of the clutch engagement, and slides the slider to the initial position by the urging force so as to be capable of reliably providing the locking actuation with the simplified structure.

In the holding device described in (6), when the storage state and the used state are switched by inverting the base approximately 180 degrees, the urging force of the inversion spring helps inversion switchover operability so as to make that excellent, and the wobbling in each state can be reliably prevented so as to be capable of improving the quality.

BRIEF DESCRIPTION OF THE DRAWINGS

FIGS. 10(a) to 10(d) are drawings for explaining movements of a placement-angle holding device in the holding device according to the embodiment of the present invention.

BEST MODES OF CARRYING OUT THE INVENTION

Hereinafter, embodiments of the present invention will be explained with reference to attached drawings.

A holding device according to the embodiment of the present invention comprises a holding tool 9 for holding an article K, and a storage case 1 housing the holding tool 9. Of those, the case 1 comprises an inversion spring S3, a crank arm 18, and the like interposed between the case 1 and the holding tool 9. The holding tool 9 comprises a base 2 including an approximately L-shaped placement portion 20, and a cover 3 assembled with one surface of the placement portion 20; a slider slidably placed in the base 2; an urging member S1 accumulating an urging force by sliding of the slider 4, or sliding the slider 4 by the accumulated urging force; a positional control device A provided between the base 2 and the slider 4, and releasably locking the slider 4 in an arbitrary position when the slider 4 has slid against the urging force of the urging member S1; a placement-angle holding device B provided between the base 2 and the case 1, and allowing the base 2 to change an angle relative to the case 1 by interlocking with the sliding of the slider 4 against the urging force of the urging member S1; and the like. Then, in the holding tool 9, the angle can change up to approximately 180 degrees at the maximum in a longitudinal direction relative to the case 1. Namely, the holding tool 9 is invertibly supported relative to the case 1.

Here, the positional control device A comprises a rack portion 45 provided in the slider 4; a one-way clutch 6 actuated to be connected to the rack portion 45; an operating button 5 allowing the slider 4 to slide by the urging force of the urging member S1 in a state of a clutch engagement of the one-way clutch 6; and the like. The placement-angle holding device B comprises a first lock member 7 actuated to be connected to the slider; a second lock member 8 engaging with and disengaging from the first lock member 7 by being held in the case 1, and also elastically holding a state after an angle adjustment of the base 2 in an engagement state; and the like. Incidentally, although all the case 1, the base 2, the cover 3, the slider 4, and the operating button 5 may be a resin molding body, they may be formed by materials other than resin. Hereinafter, each member structure will be clarified with an assembly guideline.

Figure 1:
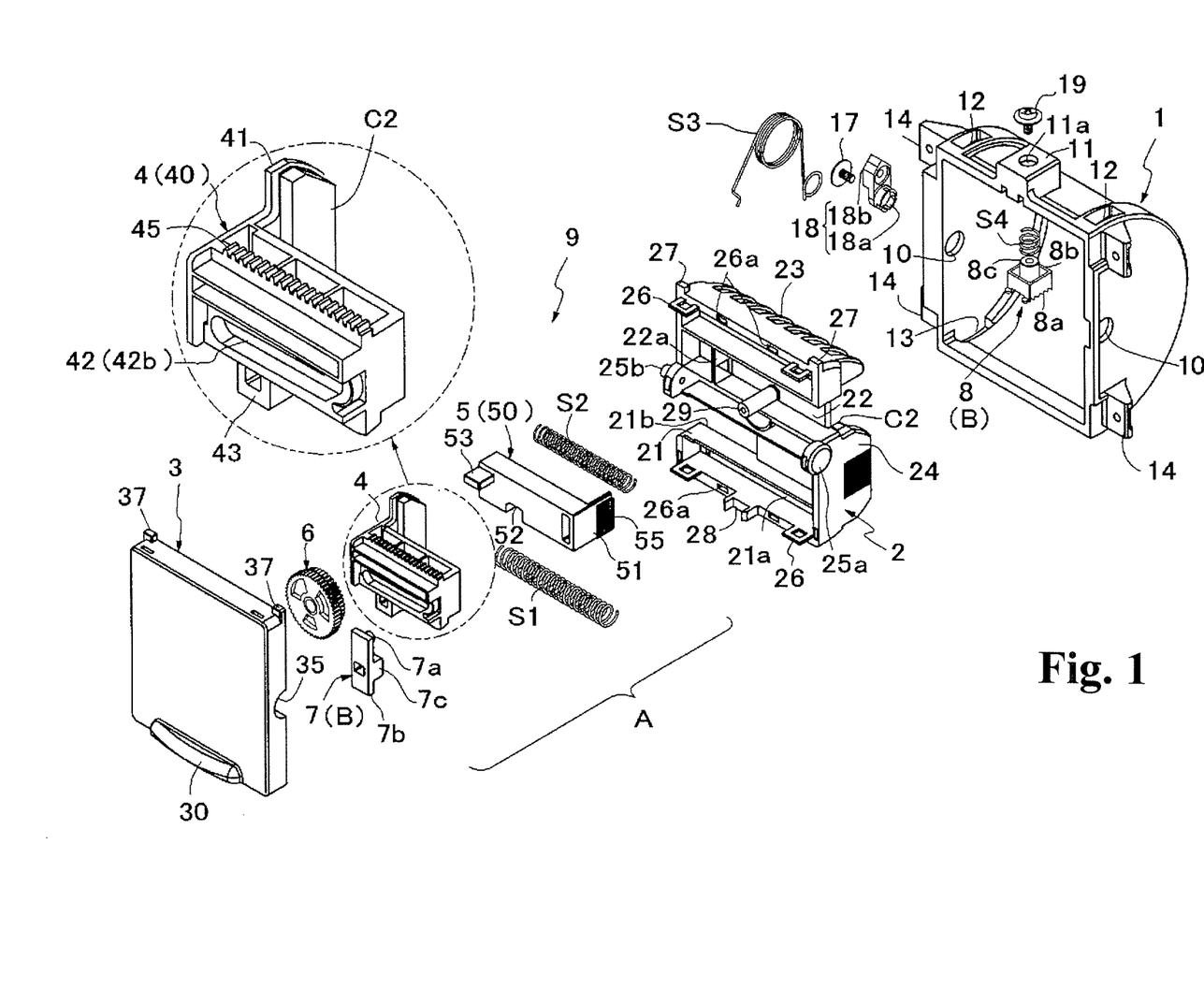
FIG. 1 is a schematic structural view wherein a holding device according to an embodiment of the present invention is exploded, and is viewed from one direction.
Figure 2:
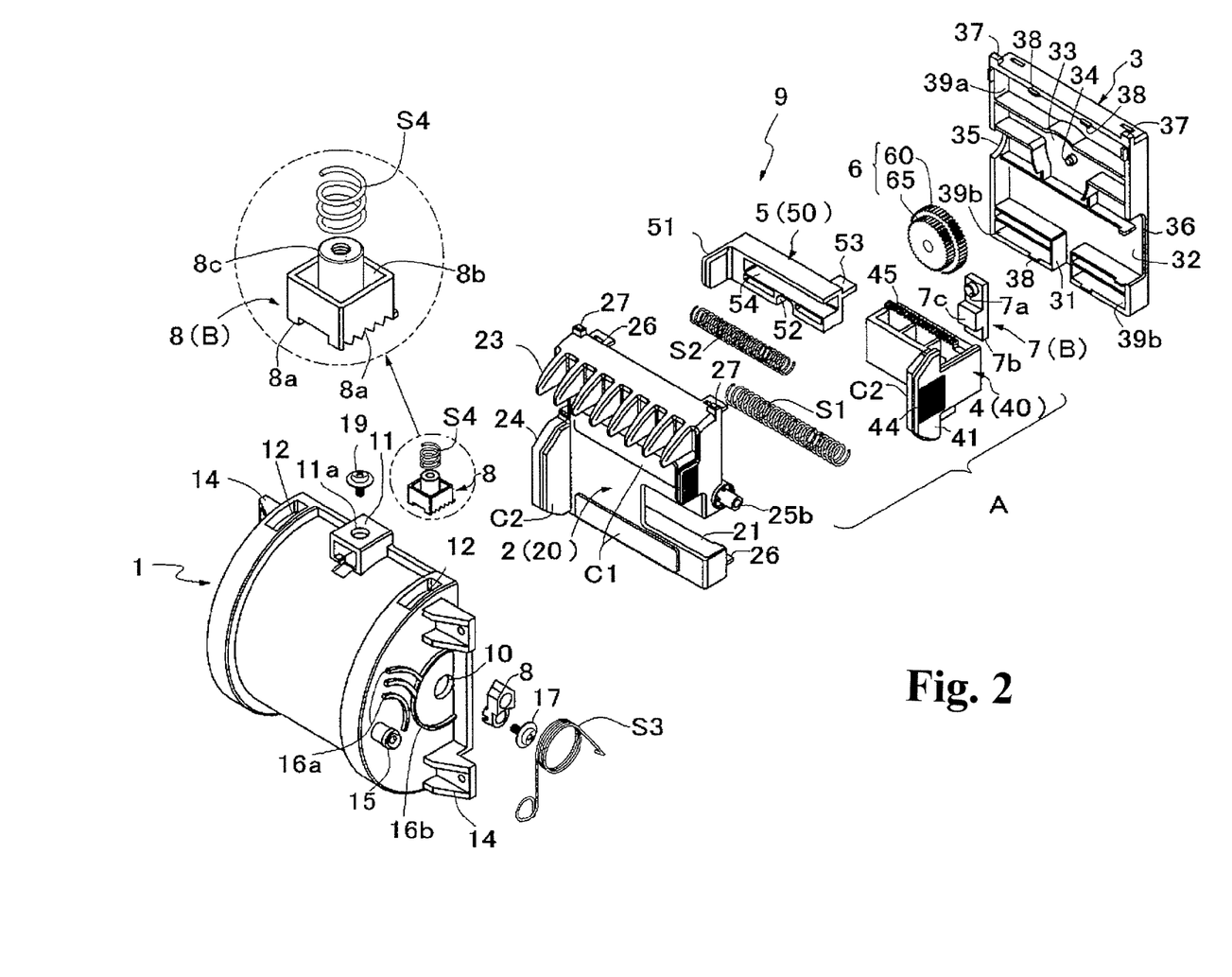
FIG. 2 is a schematic structural view of an exploded state of the holding device according to the embodiment of the present invention which is viewed from a direction opposite to FIG. 1.

As shown in FIGS. 1 and 2, the case 1 is a semicylinder-shaped component wherein an opening is provided on a near side. The case 1 includes a box portion 11 provided in an intermediate portion in a width direction near the opening of an upper portion of an outer wall face; upper engagement holes provided on both sides in the width direction of the box portion 11, and passing through up to an inside of the case 1; lower engagement holes 13 provided directly underneath (directly underneath on an inner side) the upper engagement holes 12 in a lower portion of an inner wall face; axis holes 10 which are on outer walls on both sides in an approximately middle of the wall faces near the opening, and passes through in an approximately middle of top and bottom on an opening side; and attachment portions 14 provided to protrude from top and bottom portions on the opening side. The reference numeral 15 represents an axis portion latching one end of the inversion spring S3. The reference numerals 16a and 16b are ribs stably supporting the inversion spring S3. The reference numeral 17 is a screw member axially supporting one side of the base 2 through the crank arm 18 placed in the axis holes 10. The crank arm 18 forms a cylinder portion 18a which is inserted into the axis holes 10, and a locking portion 18b latching the other end of the inversion spring S3.

As shown in FIGS. 4(a) to 4(d), and 10(a) to 10(d), the box portion 11 has an approximately cuboid shape, and a back face and a lower face are open. The box portion 11 is disposed in the center of the upper portion of the case 1. Also, on an upper face of the box portion 11, there is formed an attachment hole 11a passing through up and down. Also, inside the box portion, there is embedded the second lock member 8 structuring the placement-angle holding device B together with a spring member S4. The second lock member 8 structures the placement-angle holding device B together with the later-mentioned first lock member 7, and as shown in FIG. 2 as an enlarged view, on both sides of a lower portion thereof, there include teeth portions 8a which are latch teeth in which mountains and valleys are alternately formed continuously along a depth direction of the case 1; a concave portion 8b provided on an upper portion thereof; and an axis portion 8c provided in such a way as to protrude in a central portion of the concave portion 8b. Also, in the central portion of the axis portion 8c, there is formed a female screw hole. Also, as shown in FIG. 2 as the enlarged view, an intermediate portion in the width direction of the lower portion of the second lock member 8 is concaved. Incidentally, in each cross-sectional view of FIGS. 4(a), 4(b), 10(a), and 10(b), in order to facilitate an explanation, the aforementioned concave portion provided in the lower portion of the second lock member 8 is omitted, and each cross-sectional view of FIGS. 4(a), 4(b), 10(a), and 10(b) is illustrated such that the teeth portions 8a are formed in the entire lower portion of the second lock member 8. Accordingly, a shape of a claw 7b of the first lock member is also shown schematically.

Figure 4A:
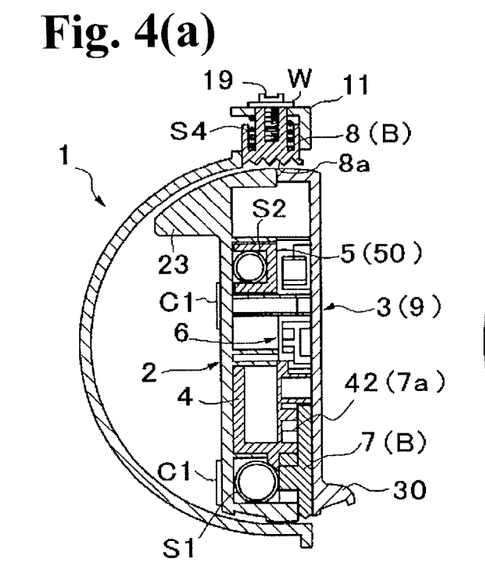
FIG. 4(a) is a vertical cross-sectional view (a cross-sectional view when the holding device is cut off in a vertical direction at an approximately center of a width direction) in the storage state (see FIG. 3(a)) of the holding device according to the embodiment of the present invention.
Figure 4B:
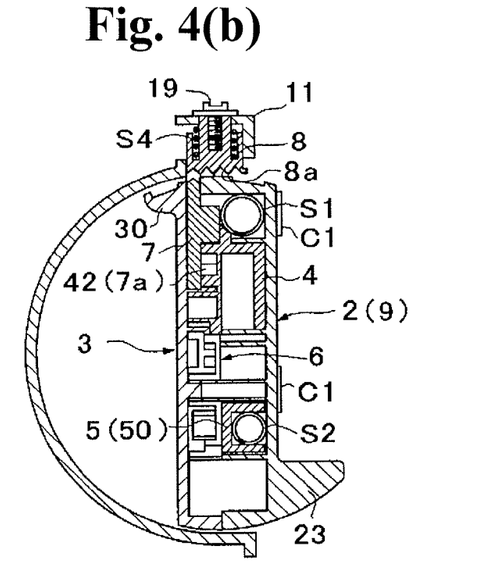
FIG. 4(b) is a vertical cross-sectional view in the used state (see FIG. 3(b)) of the holding device.
Figures 4C, 4D:
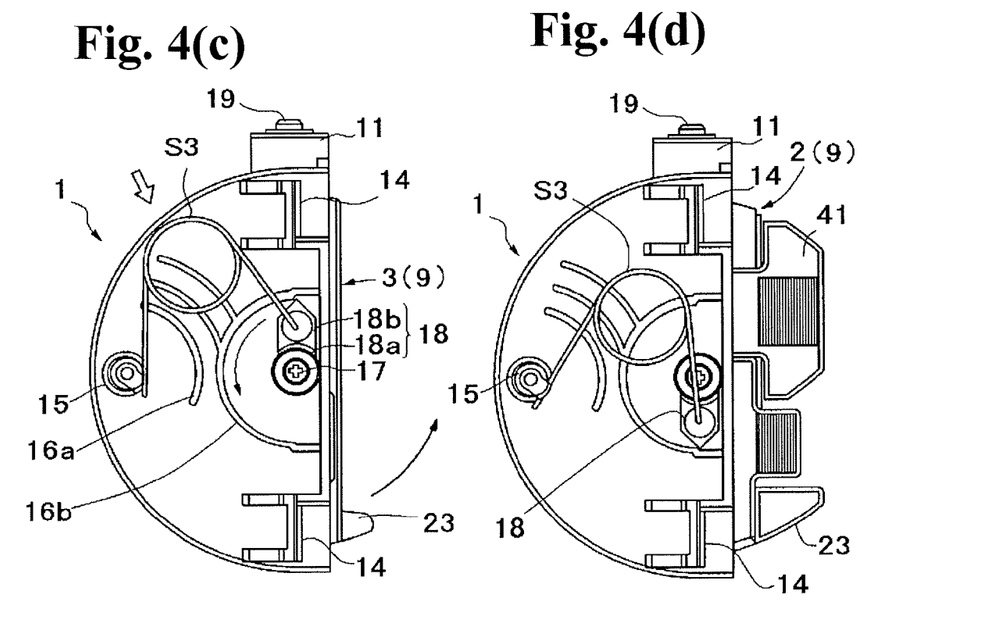
FIG. 4(c) is a side view of the holding device in the storage state.
FIG. 4(d) is a side view of the holding device in the used state.

Then, after the spring member S4, which is a coil spring, is inserted through the axis portion 8c of the second lock member 8, and a lower end portion thereof is abutted against a bottom face of the concave portion 8b, the second lock member 8 is fitted into the box portion 11 in such a way as to fit the attachment hole lie of the box portion 11 and the female screw hole of the axis portion 8c. Then, a screw 19 in which a washer W has been passed through is screwed into the female screw hole of the axis portion 8c from directly above, so that the second lock member 8 is elastically supported in the box portion 11. As shown in FIGS. 4(a) and 4(b) by the cross-sectional views, the second lock member 8 is separated from the first lock member 7 as long as the slider 4 is not slid against the urging force of the urging member S1. Then, due to an ascending movement of the first lock member 7 which has been interlocked with the sliding of the slider 4 against the urging force of the urging member S1, as shown in the cross-sectional view of FIG. 10(a), the second lock member 8 elastically engages with the first lock member 7. Also, as shown in the cross-sectional view of FIG. 10(b), when the second lock member 8 is slightly moved upward against the urging force of the spring member S4 at a time of a changing operation of a placement angle relative to the case 1 of the base 2 (the holding tool 9), the second lock member 8 engages with the first lock member 7, and holds the base 2 at a position after the change of the aforementioned placement angle. Also, at that time, teeth of the second lock member 8 engaging with the first lock member 7 differ before and after the changing operation of the aforementioned placement angle.

As shown in FIGS. 1 and 2, in the holding tool 9, the base 2 includes the placement portion 20 wherein the article K which becomes a main portion is placed; a lower receiving portion 23 protruding along an upper-side edge portion (a lower-side edge portion of the placement portion 20 in a used state) of the placement portion 20 in a storage state of the holding tool 9; a fixture holding portion 24 protruding from one side portion of the placement portion 20; and an axis portion 25a with a large diameter and an axis portion 25b with a small diameter, which protrude outward from an approximately intermediate portion of the top and bottom on both sides. Also, a back face of the placement portion 20 includes a partition portion 21 which places the slider 4 provided on a side slightly lower than the middle of the top and bottom; a partition portion 21a which places the urging member S1 provided on a lower side of the partition portion 21; a window portion 21b in which one portion of the partition portion 21 is notched so as to pass through the front and back; a partition portion 22 which places the operating button 5 provided on a side which is one level higher than the partition portion 21; an operating concave portion 21c (see FIG. 5(b)) provided along an outer face of the partition portion 21; cover positioning protrusions 26 protruding from four corners of the back face; a plurality of engagement holes 26a respectively provided between upper-side protrusions 26, between lower-side protrusions 26, and on edge portions on both sides; piece portions 27 vertically protruding from right and left on a lower receiving portion 23 side; and a concave guide portion 28 protruding from an outer wall partitioning the partition portion 21a, and guiding the first lock member 7.

Among the above, in the placement portion 20, on a placement face which abuts against the article K, and in upper and lower portions sandwiching the window portion 21b, there are attached two sheets of cushion materials C1. In the fixture holding portion 24, on an inner face which abuts against a side portion of the article K, there is attached a cushion material C2. The cushion materials C1 and C2 are made of thick urethane and the like, and are attached through a double-faced adhesive tape and the like. The partition portion 22 for the operating button is divided by a longitudinal wall 22a on a side wherein the window portion 21b is provided, and the opposite side is made in a state without a wall so as to be communicated with an outside. Also, the partition portion 22 includes an axis portion 29 provided to protrude from a central portion, and pivotally supporting the one-way clutch 6.

On the other hand, the cover 3 includes a convex knob portion 30 provided on a design face; a partition portion 32 located on a back face side, and provided in a portion corresponding to the partition portion 21 for the slider; a concave guide portion 31 provided in a portion corresponding to the guide portion 28; and a partition portion 33 provided in a portion corresponding to the partition portion 22 for the operating button. The partition portion 32, the guide portion 31, and the partition portion 33 are respectively formed to be partitioned by ribs. In the partition portion 33, there is provided a convex portion 34 engaging with the axis portion 29. On one side of the cover 3, there is provided a concave portion allowing the axis portion 25a to escape, and on the other side of the cover, there is provided an opening 36 allowing the slider 4 to escape. Also, on a back face of the cover 30, there are provided concave portions 39a and 39b engaging with each positioning protrusion 26; convex portions 38 engaging with each engagement hole 26a; and piece portions 37 vertically protruding from right and left on the outside partitioning the concave portion 39a.

From a state wherein the later-mentioned slider 4, the operating button 5, the urging members S1 and S2, the one-way clutch 6, and the first lock member 7 are embedded, the above-mentioned cover 3 is mounted relative to the base 2 with a one-touch operation by a closely-attaching operation to a base back face side, accompanied by an engagement between the positioning protrusions 26 and the concave portions 39a and 39b, an engagement between the engagement holes 26a and the convex portions 38, and an engagement between the axis portion 29 and the convex portion 34. Thereby, the holding tool 9 can be obtained.

In FIG. 1, the slider 4 includes a main body 40 sliding along the partition portion 21 and the window portion 21b on a placement portion 20 side; a movable holding portion 41 provided on one end side of the main body 40, and holding the article between the movable holding portion 41 and the fixture holding portion 24; a long groove 42 located on a back face side of the main body 40, and provided in the longitudinal direction; a convex spring receiving portion 43 located on a lower side of the main body 40, and provided downward on a side near the movable holding portion 41; and the rack portion 45 located on an upper side of the main body 20, and provided in the longitudinal direction. Among the above, in the movable holding portion 41, the cushion material C2 is attached to a holding face, and also on an outer face which becomes an operating face, there is provided a concave-convex portion 44. Incidentally, the cushion material C2 is made of thick urethane and the like in the same manner as the cushion material C2 on a base 2 side, and the article is elastically received so as to reliably hold the article between the fixture holding portion 24 and the movable holding portion 41. The concave-convex portion 44 functions as a design, and also as a non-slip portion.

Figure 7A:
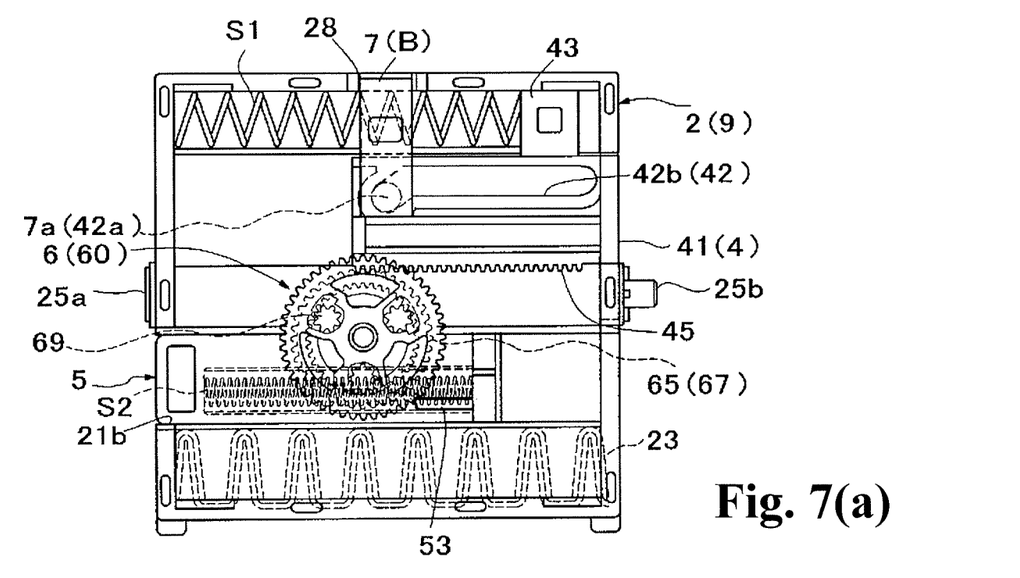
FIGS. 7(a) and 7(b) are operational views in a holding process schematically showing a movement at an operation time of holding the article in FIG. 5(a) from the state in FIG. 4(b).
Figure 7B:
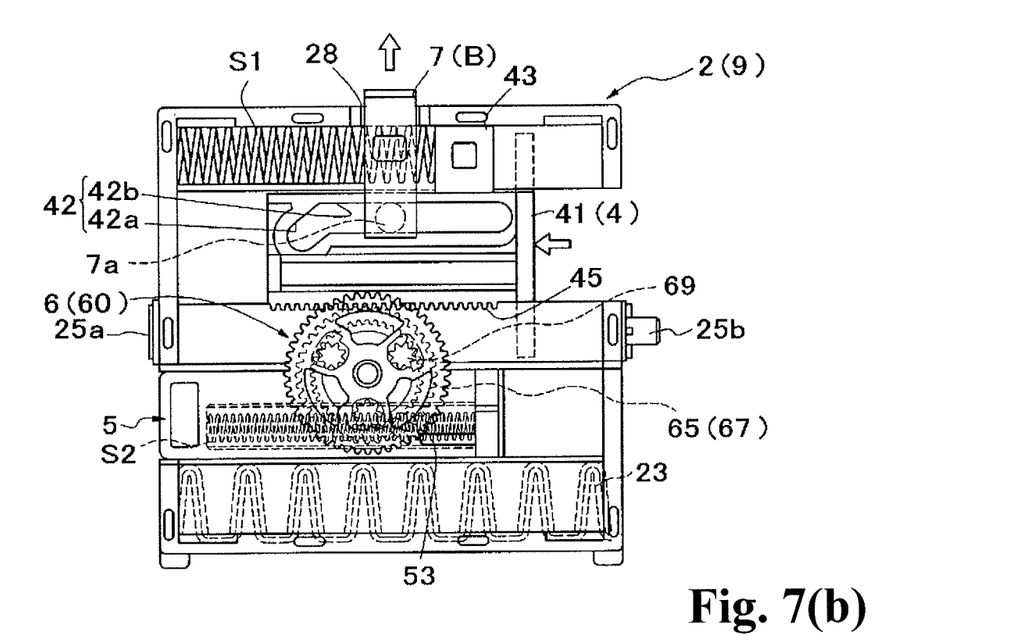
Figure 9A:
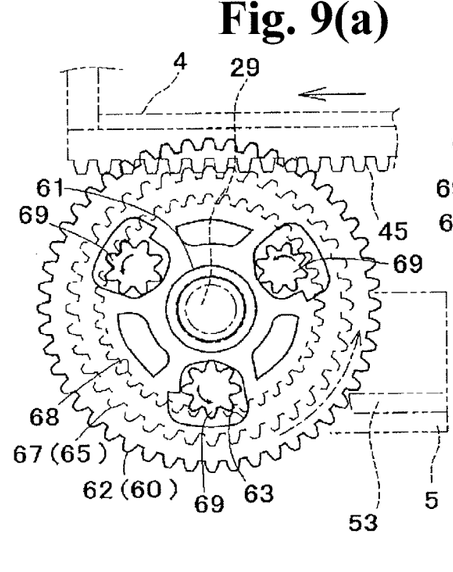
FIGS. 9(a) and 9(b) are drawings for explaining specific movements of the positional control device.
Figure 9B:
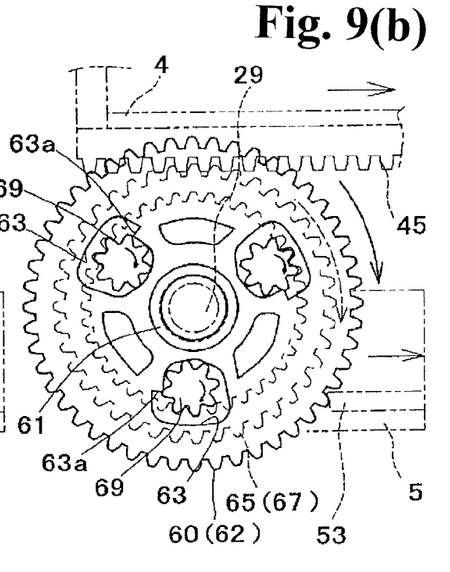

As shown in FIGS. 9(a) and 9(b), the rack portion 45 has a shape of teeth portions engaging with a first gear 65 structuring the one-way clutch 6. As shown in FIG. 7(b), the long groove 42 comprises a longitudinal groove portion 42a inclining up and down, and a lateral groove portion 42b extending in a horizontal direction from an upper side of the longitudinal groove portion 42a. The long groove 42 is actuated to be connected to the first lock member 7 slidably placed between the guide portion 28 on a base side, and the guide portion 31 on a cover side. Namely, the first lock member 7 structures the placement-angle holding device B together with the second lock member 8 and the spring member S4, and includes a protrusion 7a provided on a base end side, the claw 7b provided on an end side, and a convex portion 7c provided in an intermediate portion. Then, as shown in FIG. 7(a), when the protrusion 7a is fitted into the longitudinal groove portion 42a of the long groove 42, the first lock member 7 comes to a state of being sunk in the guide portion 28, and as shown in FIG. 7(b), when the protrusion 7a is fitted into the lateral groove portion 42b of the long groove 42, the first lock member 7 comes to a state of protruding upward from the guide portion 28. As mentioned later, in the placement-angle holding device B, in a protruding state of the first lock member 7, the claw 7b engages with the teeth portions 8a of the second lock member 8. Also, accompanied by an up-and-down movement of the second lock member 8 against the urging force of the spring member S4, the claw 7b and the teeth portions 8a can be intermittently engaged.

In a state wherein the main body 40 is placed in the partition portion 21, the above-mentioned slider 4 is embedded relative to the base 2 with an aspect wherein the urging member S1, which has been placed in the partition portion 21a, locks one end side thereof in the inner face of the fixture holding portion 24, and locks the other end side in the receiving portion 43. Then, the slider 4 is slid in a direction of separating from the fixture holding portion 24 by the urging force of the urging member S1, and is placed in an initial position of FIG. 7(a). Also, the slider 4 is operated to slide to a side of the fixture holding portion 24 against the urging force of the urging member S1. Namely, the urging member S1 accumulates the urging force when the slider 4 is slid in a direction wherein the movable holding portion 41 approaches the fixture holding portion 24, and due to the accumulated urging force, the urging member S1 allows the slider 4 to slide in the initial position (a position in which the movable holding portion 41 is separated the most from the fixture holding portion 24).

In FIGS. 1 and 2, the operating button 5 includes an arm portion 50 placed in the partition portion 22 on the base 2 side; an operating portion 51 provided to protrude from one end of the arm portion 50; a concave portion 52 provided on a lower face side of an approximately middle of right and left of the arm portion 50, and allowing the axis portion 29 to escape; a locking claw 53 provided in an end portion on a side opposite to the operating portion 51 of the arm portion 50, and protruding in a direction opposite to the operating portion 51; and a spring housing space 54 provided on a side face placed on the base 2 side of the arm portion 50. In the operating portion 51, there is provided a concave-convex portion 55 on an outer face which becomes an operating face. The concave-convex portion 55 functions as a design, and also as a non-slip portion.

Figure 8A:
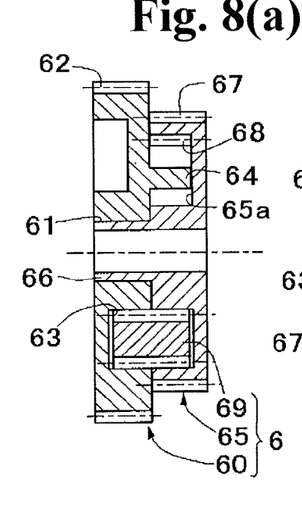
FIG. 8(a) schematically shows a cross-sectional view in a cross-section including a center axis of a one-way clutch structuring a positional control device of the holding device according to the embodiment of the present invention, and FIG. 8(b) schematically shows a cross-sectional view in a horizontal cross-section of the one-way clutch.
Figure 8B:
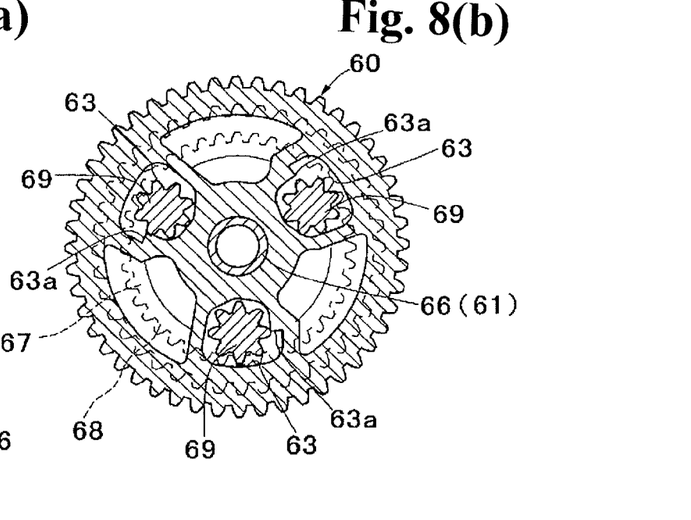

The above-mentioned operating button 5 structures the positional control device A releasably locking the slider 4 in the arbitrary position when the slider 4 is slid against the urging force of the urging member S1 together with the rack portion 45 of the slider 4, and the one-way clutch 6. Namely, as shown in FIGS. 8(a) and 8(b), the one-way clutch 6 comprises the first gear 65 engaging with the rack portion 45, and a second gear 60 actuated to be connected to the first gear 65 through planetary gears 69.

In the first gear 65, one end face is a concave portion 60a, and the first gear 65 includes an annular boss 36 protruding from a central portion of the concave portion 60a; an outer gear 67 formed on an outer circumference, and engaging with a rack portion 22; and an inner gear 38 formed on an inner circumference of the concave portion 60a, and engaging with the planetary gears 69. The second gear 60 includes an axis hole 61 inserting the boss 36 to pass through; an outer gear 62 provided on the outer circumference, and in which the locking claw 53 on an operating button side engages with and disengages from; a plurality of depressed portions 63 provided on an end face placed on a concave portion 60a side, and loosely fitting the planetary gears 69; and stable support convex portions 64 provided between the depressed portions 63. As shown in FIGS. 9(a) and 9(b), the depressed portions 63 are set in a depth size in which the planetary gears 69 are housed between the depressed portions 63 and the concave portion 60a. Also, one end side of the depressed portions 63 which is located in the same direction is formed as angle portions 63a, and by allowing teeth of the planetary gears 69 inside the depressed portions 63 to slightly escape to an angle portions 63a side, the planetary gears can halt (this is the state of the clutch engagement).

The aforementioned operating button 5 and the one-way clutch 6 are assembled relative to the base 2 through the following steps. First, the operating button 5 is placed on the partition portion 22 on the base 2 side in a state wherein the arm portion 50 has inserted the urging member S2 in the housing space 54. The urging member S2 is a coil spring, and one end side is locked in the longitudinal wall 22a, and the other end side is locked in an inner end face on an operating portion 51 side of the housing space 54 in a state wherein the urging force has been developed, so that the urging member S2 urges the operating button 5 in a direction of protruding the operating button 5 outward from the housing space 54. In a state wherein the operating button 5 is placed in the base 2, the one-way clutch 6 is pivotally supported turnably at the axis portion 29 by inserting the axis portion 29 on the base 2 side into an axis hole of the boss 36 on a first gear side. At that time, first, in a state wherein the operating button 5 is pressed and moved against the urging force of the urging member S2, and the locking claw 53 is separated from the outer gear 62 on a second gear side, the one-way clutch 6 is pivotally supported at the axis portion 29, and also the outer gear 67 on the first gear side is engaged with the rack portion 45. After that, when a pressing force relative to the operating button 5 is released, the operating button 5 is slid up to the initial position by the urging force of the urging member S2. Accordingly, the locking claw 53 is engaged with the teeth of the outer gear 62 on the second gear side.

In FIGS. 1 and 4(a) to 4(d), the axis portion 25a is fitted into one axis hole 10, the axis portion 25b is fitted into the cylinder portion 18a of the crank arm 18 which is inserted into the other axis hole 10, and the screw member 17 is screwed into the female screw portion of the axis portion 25b inside the cylinder portion 18a, so that the aforementioned holding tool 9 is pivotally supported relative to the case 1 in a retaining state. Namely, as supporting points of pivot support portions (10 and 25a) and pivot support portions (10 and 25b), the holding tool 9 is supported relative to the case 1 to be inversely switchable between the storage state in FIG. 4(a) which closes the opening of the case 1 by a surface on an opposite side of a side protruding the fixture holding portion 24, i.e., by the cover 3, and the used state in FIG. 4(b) which exposes the side protruding the fixture holding portion 24 from the opening of the case. At a time of that inversion, the holding tool 9 is turned approximately 180 degrees along an arc face of the case 1.

In the storage state, the respective piece portions 27 and 37 on the base 2 and the cover side are locked in the corresponding upper engagement holes 12 on a case side. In the used state, the respective piece portions 27 and 37 are locked in the corresponding lower engagement holes 13 on a case 1 side. Also, the inversion spring S3 is assembled between the holding tool 9 and the case 1. In the inversion spring S3, one end side of a winding wire portion is latched to the axis portion 15 on the case 1 side, and the other end side of the winding wire portion is latched to the locking portion 18b of the crank arm 18, so that an urging direction is switched in order for the holding tool 9 to be in a stable position in both the storage state and the used state. Therefore, when the holding tool 9 is switched between the storage state and the used state, the holding tool 9 can operate moderately by the urging force of the inversion spring S3, and wobbling in each state can be reliably eliminated as well.

Next, with an assumption of a case where the holding tool 9 is attached to an instrument panel of a vehicle and the like through the case 1, a performance characteristic of the holding tool 9 will be clarified. Incidentally, the case 1 is usually mounted on an appropriate portion such as the instrument panel, a console, or the like if that is the vehicle, in a buried state.

Figure 3A:
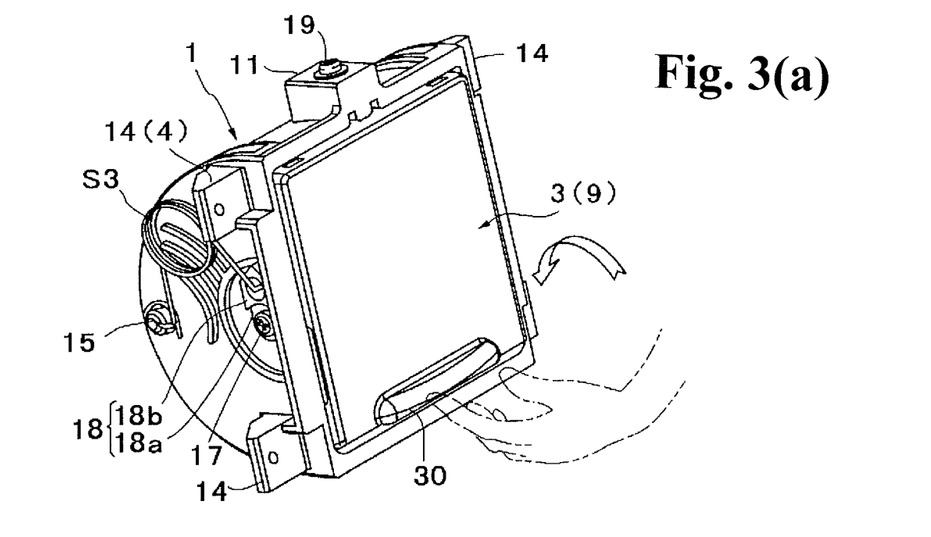
FIG. 3(a) is an external view showing a storage state of a base (a holding tool) relative to a case in the holding device according to the embodiment of the present invention.

FIGS. 3(a) and 4(a) show the storage state wherein the holding tool 9 is housed in the case 1. In that storage state, in the holding tool 9, the opening of the case 1 is closed by the cover 3, and also the respective piece portions 27 and 37 are locked in the upper engagement holes 12 on the case 1 side as mentioned above so as to stably hold a locked state thereof by the urging force of the inversion spring S3.

Figure 3B:
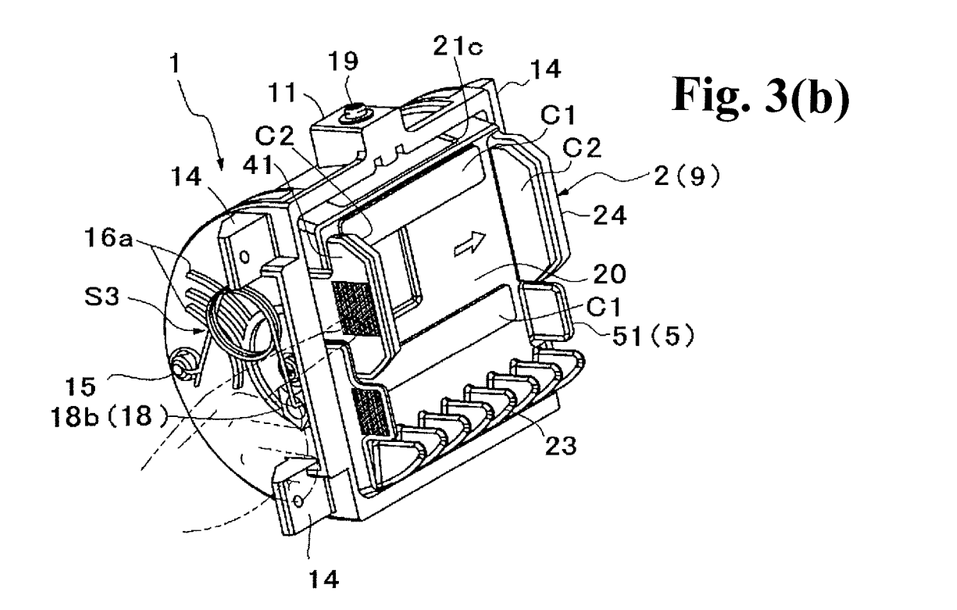
FIG. 3(b) is a drawing showing a used state of the base (the holding tool) in the holding device.

FIGS. 3(b) and 4(b) show the used state exposing a face on a side wherein the fixture holding portion 24 or the movable holding portion 41 protrudes to an outside of the case 1, by the base 2 operated to rotate approximately 180 degrees in a counterclockwise direction by, for example, operating the knob portion 30 on a cover 3 side with operator's fingers when the holding tool 9 is in the aforementioned storage state. In that state, the respective piece portions 27 and 37 are locked in the lower engagement holes 13 of the case 1, and the locked state is stably maintained by the urging force of the inversion spring S3. Then, in the structure, the holding tool 9 can be switched from the storage state to the used state, and from the used state to the storage state against the urging force of the inversion spring S3. Also, when the base 2 is rotated until just before a switching performance to each state is completed, the urging direction of the inversion spring S3 is inverted, and the holding tool 9 is urged in a switched direction so as to be stably held.

Figure 5A:
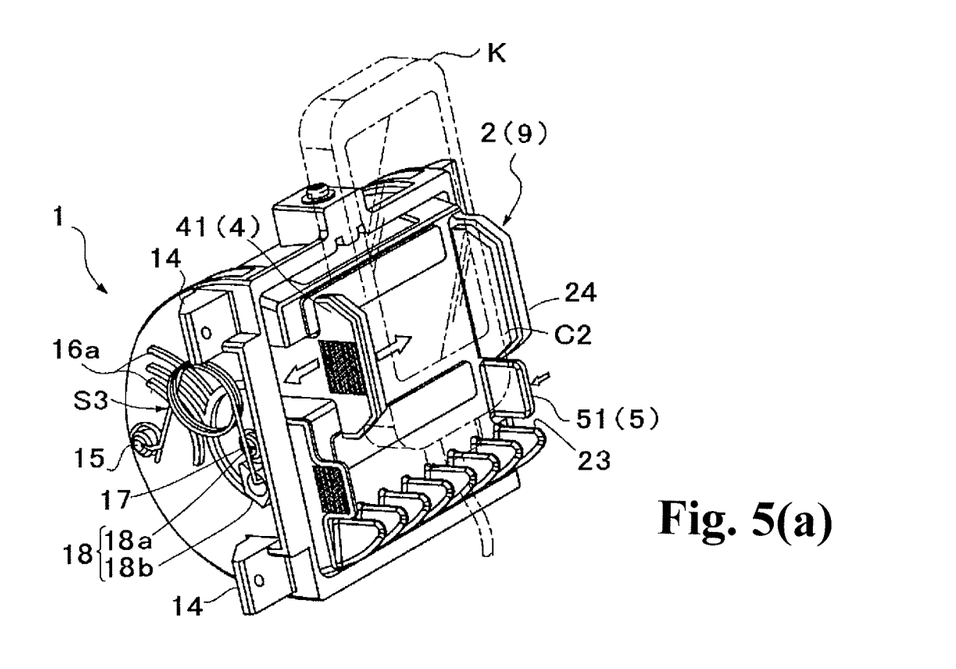
FIG. 5(a) is an external view showing a mid-flow stage of an operation allowing the holding device to clamp an article in the used state of the holding device according to the embodiment of the present invention.
Figure 6A:
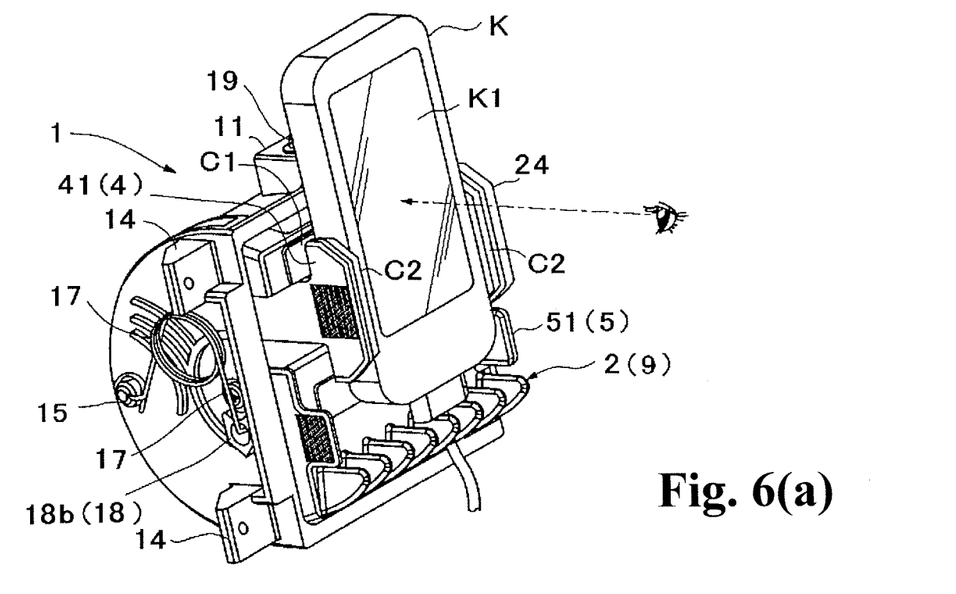
FIG. 6(a) is an external view showing a condition wherein the article is held by the holding device in the state shown in FIG. 5(a)
Figure 6B:
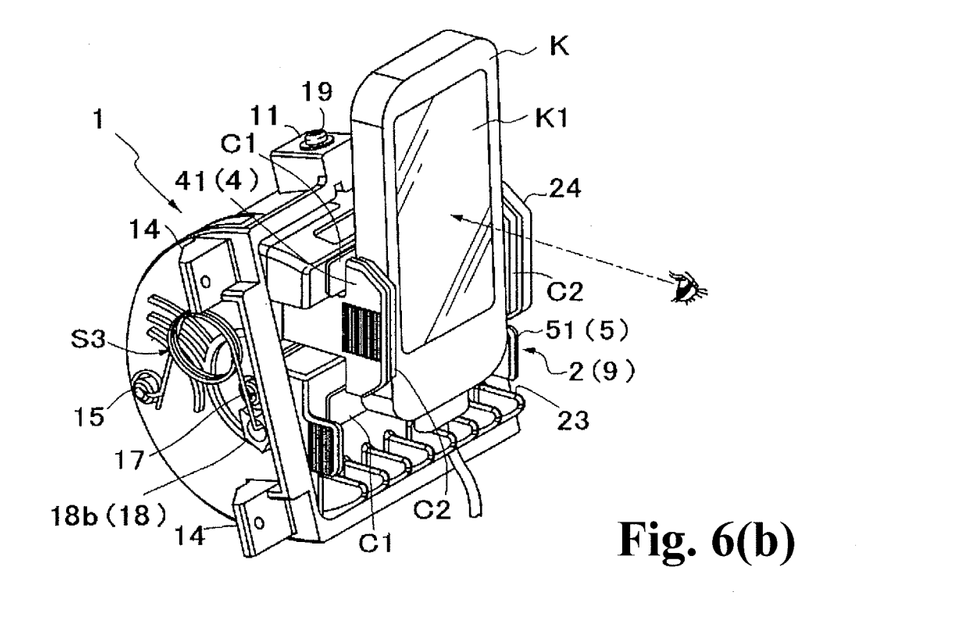
FIG. 6(b) is an external view showing a condition wherein the article is held by the holding device in the state shown in FIG. 5(b).

FIG. 5(a) shows an operational guideline in a case of holding a mobile phone K which is one example of the article K in the used state of the holding tool 9. FIGS. 6(a) and 6(b) show a state when the mobile phone K is held in the holding tool 9, and FIGS. 7(a) to 10(d) show a main actuation at that time. Incidentally, in FIGS. 7(a) and 7(b), the case 1, the cover 3, the cushion materials C1 and C2, and one portion of the base 2 are omitted, or schematically shown. Here, in a stage wherein the aforementioned holding tool 9 has been switched from the storage state to the used state, as shown in FIG. 7(a), the slider 4 is in the initial position by the urging force of the urging member S1, and in the placement-angle holding device B, the first lock member 7 fits the protrusion 7a into the longitudinal groove portion 42a of the long groove 42 on a slider side, or the first lock member 7 is moved. Also, in the positional control device A, the outer gear 67 of the first gear 65 is engaged with the rack portion 45 on a slider 4 side. The one-way clutch 6 is in the state of the clutch engagement wherein the first gear 65 is actuated to be connected to the second gear 60 through the planetary gears 69, and the operating button 5 is in a state of being held in the initial position by the urging force of the urging member S2. With that, the locking claw 53 is engaged with the outer gear 62 of the second gear 60 so as to lock the second gear 60.

Then, in order to clamp the mobile phone K, for example, as shown in FIG. 5(a), from a state wherein a corresponding-side portion of the mobile phone K is abutted against the side of the fixture holding portion 24, the slider 4 is operated to slide to the side of the fixture holding portion against the urging force of the urging member S1 until the movable holding portion 41 hits against the mobile phone K (while pushing the movable holding portion 41 in a right direction in FIG. 5(a) with one's fingers and the like). At that time, as shown in FIG. 9(a), the first gear 65 is rotated in the counterclockwise direction through an engagement between the outer gear 67 and the rack portion 45, and the positional control device A comes to a state of not being actuated to be connected to the second gear 60, i.e., a state of a clutch disengagement accompanied by an autorotation of the planetary gears 69. The aforementioned state is maintained until a sliding operation of the slider 4 halts. When one's hand or fingers are released from the movable holding portion 41, the slider 4 attempts to return to the initial position by the urging force of the urging member S1. At that time, in the structure, as shown in FIG. 9(b), the first gear 65 moves slightly in a clockwise direction at the same time as the sliding of the slider 4 in an initial positional direction, and since the planetary gears 69 are engaged with the inner gear 68, the first gear 65 attempts to rotate inversely inside the depressed portions 63. However, as shown in FIG. 9(b), the first gear 65 abuts against the angle portions 63a inside the depressed portions so as to halt the rotation, and to come to a state of being actuated to be connected to the second gear 60, i.e., the state of the clutch engagement. Consequently, in the positional control device A, at almost the same time as releasing one's hand or fingers from the movable holding portion 41, the slider 4 is maintained in a halting state by the operating button 5 locking the one-way clutch 6 and the second gear through the locking claw 53. As a result, the mobile phone K is held between the fixture holding portion 24 and the movable holding portion 41. The aforementioned held state is ensured in addition to an elastic force of the cushion material C2 on both sides, and as long as the operating button 5 is not pushed, the held state is maintained. The mobile phone K is also stably held by being held on a top of the lower receiving portion 23 in addition to the aforementioned holding from both sides.

However, as for a holding posture of the mobile phone K, from a usual posture of FIG. 6(a), there is also a time of a demand to change a holding angle as shown in FIG. 6(b) so as to improve usability or to make a screen K1 more visible.

Figure 5B:
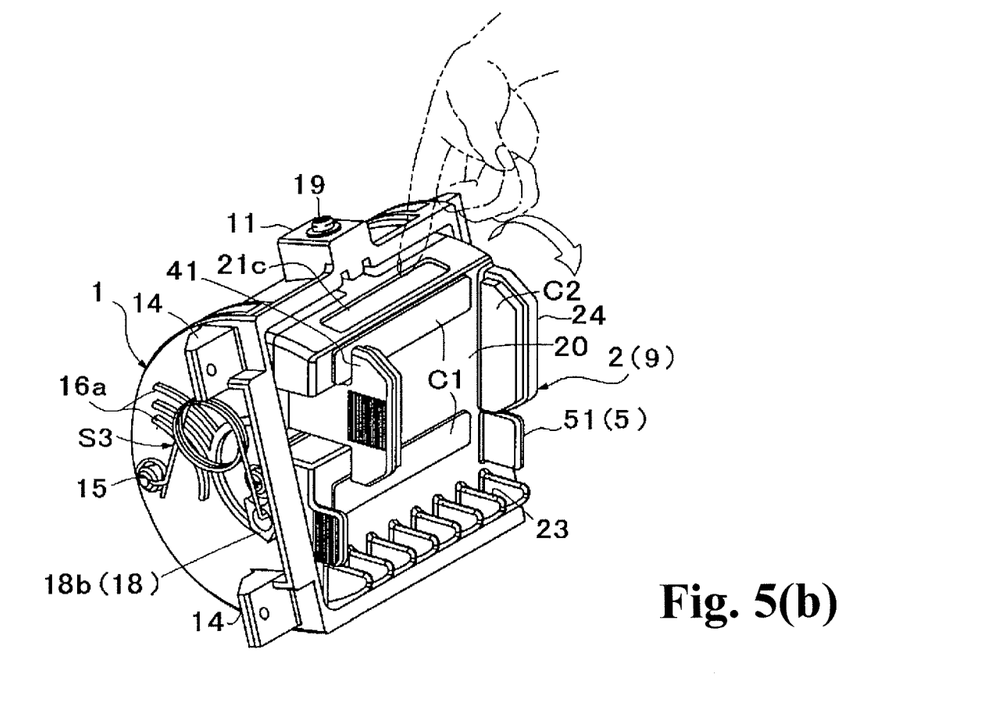
FIG. 5(b) is an external view showing an operational guideline when an angle of the base of the holding device is changed.
Figures 10A, 10B:
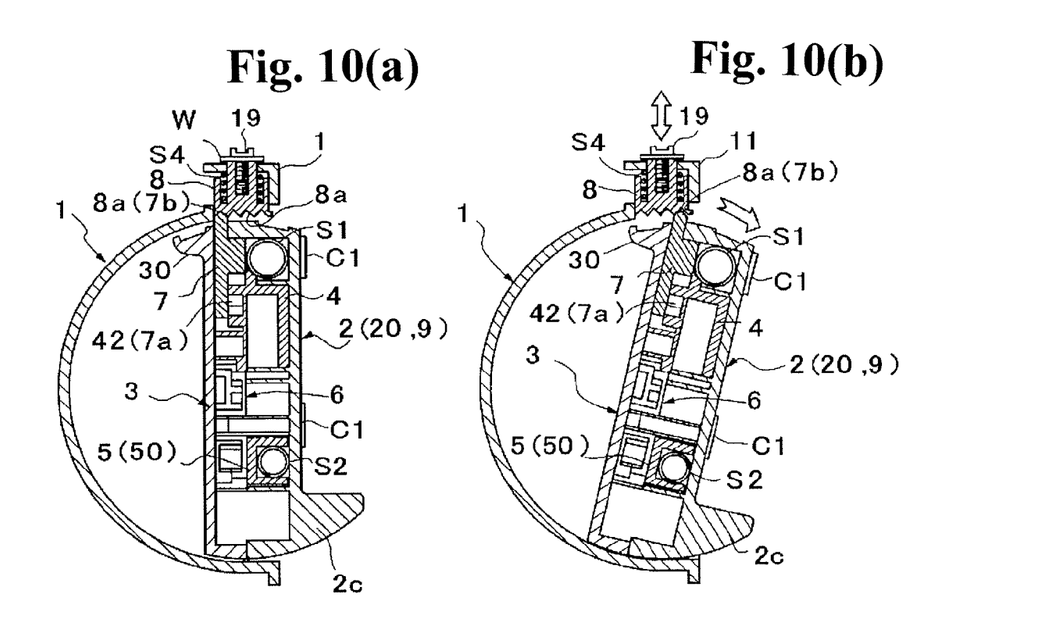
FIG. 10(a) is a vertical cross-sectional view of the holding device when the holding device is in the state of FIG. 5(a)
FIG. 10(b) is a vertical cross-sectional view of the holding device when the holding device is in the state of FIG. 5(b)
Figure 10C:
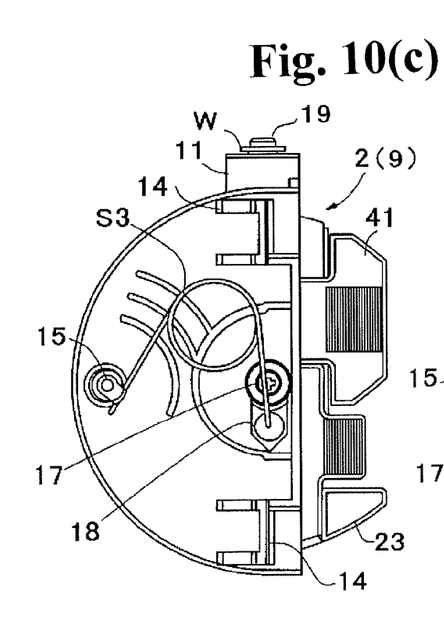
FIG. 10(c) is a side view of the holding device when the holding device is in the state of FIG. 5(a)
Figure 10D:
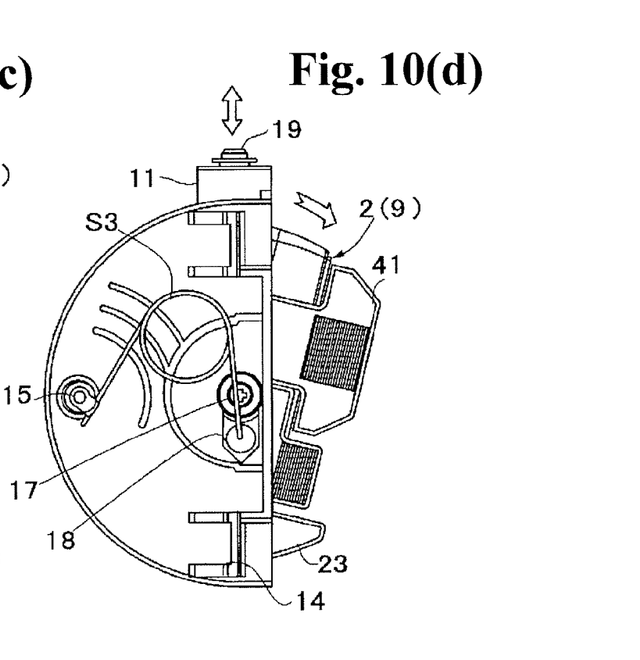
FIG. 10(d) is a side view of the holding device when the holding device is in the state of FIG. 5(b).

In the structure, such demand is actualized by the long groove 42 on the slider side, and the placement-angle holding device B including the first lock member 7, the second lock member 8, and the spring member S4. FIGS. 5(b) and 10(b) show an operation and an actuation when the holding angle is changed by the placement-angle holding device B.

In the structure, as mentioned above, when the slider 4 slides to the side of the fixture holding portion 24 against the urging force of the urging member S1, as shown in FIG. 7(b), the first lock member 7 interlocks with the sliding of the slider 4, i.e., ascends and moves accompanied by a transfer of the protrusion 7a from the longitudinal groove portion 42a to the lateral groove portion 42b. Accordingly, as shown in FIG. 10(a), the claw 7b on an end elastically engages with the teeth portions 8a of the second lock member 8 on the case side. Consequently, when the holding angle is changed, for example, as shown in FIG. 5(b), by placing ones' fingers on the concave portion 21c on the base side, the base 2 is attempted to be pulled out to the near side, or by using the lower receiving portion 23, the base 2 is attempted to be pushed to a back side of the case 1. Then, in the holding tool 9, in the first lock member 7 relative to the second lock member 8, the claw 7b is placed in the depth direction of the case, or a front-and-back direction of the case, and elastically engages with the teeth on an outside from the teeth on the back side structuring the teeth portions 8a intermittently. Accordingly, a state after the angle adjustment of the holding tool 9 or the base 2 is maintained by the engagement thereof.

In a case where the holding tool 9 is returned to the usual posture again, when the holding tool 9 or the base 3 is pushed to the inside of the case 1, as shown in the cross-sectional view of FIG. 10(a), in a state wherein the end claw 7b of the first lock member 7 is elastically engaged with the teeth portions 8a, a back face of the claw 7b abuts against an opening edge of the case 1 so as to prevent the holding tool 9 from being squished excessively further than the usual posture. This operation is carried out before the following operating button 5 is operated to be pushed.

As shown in FIG. 5(a), when the held mobile phone K is taken out again, the operating button 5 is pushed against the urging force of the urging spring S2 by placing ones' fingers on the operating portion 51. Then, in the aforementioned positional control device A, the operating button 5 slightly moves to a right side of FIG. 9(b), and the locking claw 53 is disengaged from the outer gear 62 of the second gear 60. Then, as mentioned above, the second gear 60 is actuated to be connected to the first gear 65 through the planetary gears 69, i.e., the one-way clutch 6 is in the clutch engagement, so that the entire one-way clutch 6 is switched to a state capable of idle running. As a result, while the one-way clutch 6 is running idle through the engagement between the rack portion 45 and the outer gear 67 of the first gear, the slider 4 is slid up to the initial position by the urging force of the urging member S1 so as to release the binding relative to the mobile phone K. After that, as needed, the holding tool 9 is switched to the storage state from the used state in the aforementioned guideline. In the structure, the holding tool 9 employs an inversion switchover method relative to the case 1, so that in the used state and each posture in FIGS. 6(a) and 6(b), compared to a drawer structure, a protruding portion can be controlled, thereby, the structure excels in simplification and safety as well.

Incidentally, the present invention is not limited to the aforementioned embodiment, and details can be modified or developed with reference to the aforementioned embodiment provided that structures which will be specified in claims are substantively comprised. For example, as the one-way clutch 6, a damper mechanism or a braking force can be added so that the entire structure or the first gear 65 can be gently rotated, or can be run idle; a case corresponding portion can be formed on a device side which places the holding tool 9; or as an inversion structure of the holding tool 9 or the base 2, instead of the structure which inverts in the longitudinal direction, the structure can be inverted in a transverse direction as described in Japanese Patent Application Publication No. 2009-274145.

The present application is based on Japanese Patent Application (Japanese Patent Application No. 2010-041230) filed on Feb. 26, 2010, and contents thereof are incorporated herein as a reference.

EXPLANATION OF SYMBOLS

1 . . . a case (10 is an axis hole, 11 is a box portion, 12 is upper engagement holes, and 13 is lower engagement holes)
2 . . . a base (20 is a placement portion, 24 is a fixture holding portion, and 25 is an axis portion for pivot support portions)
3 . . . a cover (30 is a knob portion, 38 is engaging convex portions, and 39a and 39b are engaging concave portions)
4 . . . a slider (40 is a main body, 41 is a movable holding portion, 42 is a long groove, and 45 is a rack portion)
5 . . . an operating button (positional control device A: 50 is an arm portion, 51 is an operating portion, 52 is a concave portion, and 53 is a locking claw)
6 . . . a one-way clutch (the positional control device A: 60 is a second gear, and 65 is a first gear)
7 . . . a first lock member (placement-angle holding device B: 7a is a protrusion, and 7b is a claw)
8 . . . a second lock member (the placement-angle holding device B: 8a is teeth portions, and 8c is an axis portion)
9 . . . a holding tool
C1 and C2 . . . cushion materials
S1 and S2 . . . urging members
S3 . . . an inversion spring
S4 . . . a spring member (the placement-angle holding device B)
K . . . a mobile phone (an article)

What is claimed is:
1. A holding device, comprising:
a case;
a base including a placement portion for placing an article, and a fixture holding portion provided on one end side of the placement portion, and rotatably attached relative to the case through a pivot support portion, said base being inversely switchable between a storage state closing an opening of the case with a face having the fixture holding portion protrudingly and a used state exposing the face having the fixture holding portion protrudingly from the opening of the case by turning the base relative to the case;
a slider slidably attached to the base, and including a movable holding portion for releasably holding the article between the movable holding portion and the fixture holding portion;
an urging member urging the slider;
a positional control device provided between the base and the slider, and releasably locking the slider in an arbitrary position when the slider slides against an urging force of the urging member; and
a placement-angle holding device provided between the base and the case, and holding the base at a predetermined placement angle relative to the case in conjunction with sliding of the slider against the urging force of the urging member.
2. A holding device according to claim 1, wherein the placement-angle holding device comprises
a first lock member actuated to connect to the slider, and protruding outward from an end portion of the base in conjunction with the sliding of the slider against the urging force of the urging member from an initial position; and a second lock member provided in the case and facing the first lock member in the used state, said second lock member elastically holding the base at the predetermined placement angle relative to the case by engaging with the first lock member in the state in which the first lock member protrudes outward from the end portion of the base.

3. A holding device according to claim 2, wherein the first lock member includes a protrusion provided on a base end side, and a claw provided on an end side, the protrusion of the first lock member being fitted into a long groove provided in the slider; and the second lock member includes teeth portions placed in a depth direction of the case, the claw of the first lock member being intermittently engageable with the teeth portions.

4. A holding device according to claim 1, wherein the positional control device comprises a rack portion provided in the slider;

a one-way clutch including a first gear engaging with the rack portion, and a second gear coming to a clutch disengagement idling the first gear when rotating the first gear in one direction, and coming to a clutch engagement integrally rotating with the first gear when rotating the first gear in the other direction; and an operating button slidably placed in the base, and allowing an engagement with the second gear to be released by a push operation against the urging force from a normal state urged in an engaging direction with the second gear.

5. A holding device according to claim 4, wherein the one-way clutch is switched between the clutch disengagement when the slider is slid against the urging force of the urging member, and the clutch engagement when the slider is slid by the urging force of the urging member, and the operating button is capable of sliding the slider up to an initial position with the urging force of the urging member by releasing the engagement with the second gear in a state of the clutch engagement.

6. A holding device according to claim 1, wherein the base is pivotally rotatably supported approximately 180 degrees along an arc face of the case as a supporting point of the pivot support portion, and includes an inversion spring stabilizing the base relative to the case in a position of both the storage state and the used state.

* * * * *